(12) United States Patent
Nakano

(10) Patent No.: US 8,226,813 B2
(45) Date of Patent: *Jul. 24, 2012

(54) METHOD OF PURIFYING WATER AND APPARATUS THEREFOR

(75) Inventor: Takayuki Nakano, Tokyo (JP)

(73) Assignee: Koganei Corporation, Tokyo (JP)

( * ) Notice: Subject to any disclaimer, the term of this patent is extended or adjusted under 35 U.S.C. 154(b) by 508 days.

This patent is subject to a terminal disclaimer.

(21) Appl. No.: 12/310,567

(22) PCT Filed: Aug. 20, 2007

(86) PCT No.: PCT/JP2007/066096
§ 371 (c)(1),
(2), (4) Date: Feb. 27, 2009

(87) PCT Pub. No.: WO2008/026462
PCT Pub. Date: Mar. 6, 2008

(65) Prior Publication Data
US 2010/0175997 A1    Jul. 15, 2010

(30) Foreign Application Priority Data
Aug. 29, 2006   (JP) ................. 2006-231530

(51) Int. Cl.
*C02F 1/46* (2006.01)
(52) U.S. Cl. ..... 205/742; 205/743; 205/759; 204/228.6; 204/275.1
(58) Field of Classification Search ............. 205/42, 205/743, 759; 204/228.6, 275.1
See application file for complete search history.

(56) References Cited

U.S. PATENT DOCUMENTS

| | | | |
|---|---|---|---|
| 3,767,046 A | | 10/1973 | Hartkorn |
| 4,087,337 A | | 5/1978 | Bennett |
| 4,119,517 A | * | 10/1978 | Hengst ............. 204/228.3 |
| 5,427,667 A | | 6/1995 | Bakhir et al. |
| 5,439,577 A | * | 8/1995 | Weres et al. ............. 204/268 |
| 5,843,291 A | | 12/1998 | Eki et al. |
| 6,645,366 B2 | | 11/2003 | Iseki et al. |
| 6,875,362 B2 | | 4/2005 | Hiro et al. |
| 7,901,620 B2 | | 3/2011 | Taguchi et al. |

FOREIGN PATENT DOCUMENTS

| | | |
|---|---|---|
| JP | 58-35400 | 3/1983 |
| JP | 61-181591 | 8/1986 |
| JP | 2-247393 | 10/1990 |
| JP | 4-18982 | 1/1992 |

(Continued)

*Primary Examiner* — Arun S Phasge
(74) *Attorney, Agent, or Firm* — Christie, Parker & Hale, LLP.

(57) ABSTRACT

A method of purifying cooling water which requires the lowest maintenance and management cost without the need for a cumbersome cleaning operation for removing scale in an electrolytic purifying vessel by taking out the electrodes from the electrolytic purifying vessel, and an apparatus therefor are provided. In the method of purifying circulating cooling water by applying a DC voltage across opposing electrodes while flowing water to be treated therebetween, so that ions in the water are electrolytically precipitated on the surfaces of electrodes on the negative pole side, thereby purifying the water to be treated, the electrodes comprise titanium and have an oxide film preformed by heating having a thickness of 5 nm to 130 nm thereon, and electric current is flown between the electrodes in an amount large enough to apply a voltage capable of dielectrically breaking down the oxide film on the surfaces of electrodes on the positive pole side.

15 Claims, 11 Drawing Sheets

FOREIGN PATENT DOCUMENTS

| | | |
|---|---|---|
| JP | 4-244291 | 9/1992 |
| JP | 06-228783 | 8/1994 |
| JP | 07-088476 | 4/1995 |
| JP | 7-90665 | 4/1995 |
| JP | 08-299990 | 11/1996 |
| JP | 09-038668 | 2/1997 |
| JP | 9-103797 | 4/1997 |
| JP | 11-114335 | 4/1999 |
| JP | 2000-140849 | 5/2000 |
| JP | 2001-137858 | 5/2001 |
| JP | 2001-137891 | 5/2001 |
| JP | 2001-259690 | 9/2001 |
| JP | 2003-027275 | 1/2003 |
| JP | 2003-200170 | 7/2003 |
| JP | 2003-275761 | 9/2003 |
| JP | 2005-13966 | 1/2005 |
| JP | 2005-152864 | 6/2005 |
| JP | 2006-061844 | 3/2006 |
| JP | 2006-98003 | 4/2006 |

* cited by examiner

METHOD OF PURIFYING WATER AND APPARATUS THEREFOR

CROSS-REFERENCE TO RELATED APPLICATION

This application is a National Phase Patent Application and claims the priority of International Application Number PCT/JP2007/066096, filed on Aug. 20, 2007, which claims priority of Japanese Patent Application Number 2006-231530, filed on Aug. 29, 2006.

TECHNICAL FIELD

This invention relates to a method of purifying water and an apparatus therefor, particularly to a method of purifying water by electrochemically removing scale contained in cooling water used, for example, in office or factory facilities, or contained in cooling water circulating between a condenser and a cooling tower of air conditioners used for cooling, and to an apparatus therefor.

BACKGROUND ART

FIG. 12 is a diagram illustrating an air-conditioning system. As shown, an air conditioner 64 includes a compressor (not shown) for compressing a gaseous refrigerant, a condenser 66 for cooling and condensing, by using cooling water, the gaseous refrigerant that has generated heat upon being compressed, and an evaporator (not shown) for evaporating the refrigerant by permitting it to flow in through an expansion valve, the refrigerant being obtained by condensation through the condenser 66.

The condenser 66 is provided in a cooling tank 70 to cool the gaseous refrigerant that flows through the condenser 66, and cooling water is fed to the cooling tank 70 from a cooling tower 68. The cooling tower 68 feeds the cooling water to the cooling tank 70, and includes a cylindrical tower body 72 and a water-receiving vessel 74 provided under the tower body 72, the water-receiving vessel 74 and the cooling tank 70 being connected together through a feed line 76.

The tower body 72 incorporates therein a filler unit 78 having many passages though which the cooling water and the cooling air flow. The tower body 72 has a spray nozzle 80 for spraying the cooling water onto the filler unit 78, the spray nozzle 80 being connected to the cooling tank 70 through a return line 82, whereby the cooling water in the cooling tank 70 is fed to the spray nozzle 80 by a circulating pump 84 provided in the feed line 76.

The cooling water sprayed onto the filler unit 78 from the spray nozzle 80 flows through many passages formed in the filler unit 78, and falls into the water-receiving vessel 74. Thus, a cooling water path through which the water circulates is formed by the cooling tower 68, cooling tank 70, and feed line 76 and return line 82 connecting them together, and the water flows through the cooling water path by operating the circulating pump 84.

A blower 86 is provided at an upper position in the tower body 72, the air flows in being sucked up from the lower portion of the tower body 72 by the blower 86, and the air that has flowed in flows through the passages in the filler unit 78 against the flow of the cooling water. The cooling water comes into direct contact with the air that flows reversely, and partly evaporates while exchanging heat. The cooling water is further cooled by losing evaporation heat. To replenish the cooling water that has decreased by the evaporation of the cooling water, the tower body 72 is replenished with the cooling water through a replenishing line 90 that may be opened or closed by a float 88.

As described above, the cooling tower 68 cools the cooling water by utilizing the loss of heat of vaporization at the time when the cooling water partly evaporates. Therefore, the cooling water is evaporating away from the cooling tower 68 at all times. The city water and underground water used as the cooling water in the cooling tower 68 contains cations such as calcium ions, magnesium ions and dissolved silica (contained in scale). The cooling water that decreases by evaporation is constantly replenished with the city water or underground water together with cations.

Therefore, the concentration of cations contained in the cooling water gradually increases. Concretely, the electric conductivity of the city water initially supplied, which is 100 to 200 $\mu$S/cm increases to not lower than 1000 $\mu$S/cm in several days to a week. The cations coagulate to form scale, causing such problems as lowering the heat-exchanging efficiency by adhesion on the heat-exchanging surfaces of the condenser 66 and increasing the flow resistance of cooling water due to deposition on the inner surfaces of pipings through which the cooling water is circulating.

Various germs such as algae and *Legionella pneumophila* propagate in large amounts in the cooling water which scatters from the cooling tower together with these various germs causing such problems as may impair the health of people working around the cooling tower and may impair health of local inhabitants.

Therefore, a countermeasure has been employed for preventing the occurrence of scale by lowering the concentration of cations by diluting the cooling water with city water or ground water. However, this increases the cost of the cooling water in those districts where city water or underground water is expensive, and therefore, disadvantageously increases the cost for the maintenance and management of the air conditioners.

In establishments where the city water or underground water is not cheaply available, it has been attempted to add a chemical agent to the circulating water to control the electric conductivity of the cooling water in order to prevent the adhesion of scale on the heat-exchanging surfaces of the condenser or on the inner surfaces of pipings. However, the chemical agent must be added to the cooling water at regular intervals requiring a considerable amount of cost even when the above method is employed.

Even when the chemical agent is added to the cooling water, it is not possible to completely avoid the scale from solidly adhering on the heat-exchanging surfaces of the condenser or on the inner surfaces of pipings, and removal of the solidly adhered scale is still required, even though the interval for the removal work can be extended. Therefore, laborious work and expenditure could not be avoided.

As for the problem of propagation of algae and various germs, a countermeasure has been taken by adding a germicide to the cooling water. However, propagation of algae and various germs cannot be avoided in the long run, and algae and various germs scatter into the open air from the cooling tower together with the germicide causing air pollution.

In order to solve these problems, therefore, many kinds of purifying apparatuses have been proposed by, for example, introducing, into an electrolytic purifying vessel, an electrode unit in which electrodes are opposed to each other, introducing the cooling water into the electrolytic purifying vessel, applying positive and negative voltages to the electrodes, allowing the cations contained in the cooling water to be precipitated as scale on the surfaces of the negative electrodes, and removing the cations from the cooling water.

Patent document 1: JP-A-2001-259690
Patent document 2: JP-A-4-18982
Patent document 3: JP-A-61-181591
Patent document 4: JP-A-58-35400
Patent document 5: JP-A-2001-137891
Patent document 6: JP-A-9-103797
Patent document 7: JP-A-2001-137858
Patent document 8: JP-A-9-38668
Patent document 9: JP-A-11-114335

DISCLOSURE OF THE INVENTION

When these purifying apparatuses are operated for extended periods of time; however the scale precipitates and deposits on the surfaces of the negative electrodes becoming gradually thick, interrupting the electric current from flowing and decreasing the function for purifying the cooling water. When the scale has deposited more than a predetermined level, therefore, service personnel must take out the negative electrodes from the purifying apparatus, and physically remove the scale from the electrodes, posing a problem of cumbersome maintenance and management of the purifying apparatus and increased cost.

To cope with this problem, a purifying apparatus has been proposed according to which the polarities of the electrodes on the negative pole side and of the electrodes on the positive pole side are automatically reversed at predetermined intervals to peel off the scale adhered to the surfaces of the electrodes on the negative pole side. Even with this purifying apparatus, however, the scale firmly and solidly adhered to the surfaces of the electrodes cannot be practically peeled off; i.e., scale partly remains on the electrodes, and the remaining scale accumulates gradually to finally interrupt the flow of electric current and making it difficult to purify the cooling water. Service personnel must peel and remove the scale solidly adhered on the surfaces of the electrodes on the negative pole side, still requiring cumbersome maintenance and management of the purifying apparatus and increased cost.

The purifying apparatus of this type uses expensive noble metal materials such as Pt as electrodes or such materials as SUS and Fe that wear out easily, posing a problem in that the apparatus becomes expensive and high running cost is required.

It is therefore an object of this invention to provide a method of purifying cooling water which requires least work for the maintenance and management without the need of cumbersome cleaning operation for removing scale in an electrolytic purifying vessel by taking out the electrodes from the electrolytic purifying vessel, and an apparatus therefor.

According to the method of purifying water of the invention, in a state where water to be treated is flowing between the opposing electrodes, electric current is flown between the opposing electrodes by applying a DC voltage thereto, so that cations in the water to be treated are precipitated on the surfaces of electrodes on the negative pole side to thereby purify the water to be treated. The electrodes may have any shape, such as plates, round rods, square rods, etc.

The opposing electrodes comprise titanium and have an oxide film preformed by heating having a thickness of 5 nm to 130 nm on the surfaces thereof. It is, therefore, allowed to flow a current between the electrodes large enough to apply a voltage capable of dielectrically breaking down the oxide film on the surfaces of electrodes on the positive pole side.

The lower limit of thickness of the oxide film is 5 nm, which means that the oxide film is formed having a thickness not smaller than that of an oxide film which spontaneously generates on the surfaces of Ti. The upper limit of thickness of the oxide film is 130 nm, which means that the upper limit of thickness of the oxide film usually obtained by heat treatment is 130 nm. However, the use of the oxide film having a larger thickness may be possible.

The polarity of voltage applied across the electrodes may be switched at predetermined intervals. Further, the applied voltage may be elevated by flowing a constant current through the oxide film on the positive pole side. It is desired that the electric current flowing between the electrodes is 0.1 to 20 A per a unit area (1 $m^2$) of the electrodes of the positive pole side. If the electric current is smaller than 0.1 $A/m^2$, the circulating cooling water cannot be sufficiently purified. If the electric current exceeds 20 $A/m^2$, the electrodes are quickly corroded and can no longer be used.

When the electric conductivity of the water to be treated is higher than a predetermined value A, the electric current flowing between the electrodes may be increased, and when the electric conductivity of the water to be treated is lower than a predetermined value B, the electric current flowing between the electrodes may be decreased, the predetermined value A and the predetermined value B maintaining a relationship $A \geq B$. Preferably, the predetermined value A of electric conductivity of the water is 100 to 3000 μS/cm and the predetermined value B thereof is 100 to 3000 μS/cm. More preferably, the predetermined value A is 700 to 800 μS/cm and the predetermined value B is 700 to 800 μS/cm. In this case, further, it is desired to maintain a relationship $A \geq B$.

When the oxidation-reduction potential of the water to be treated is higher than a predetermined value C, the electric current flowing between the electrodes may be increased, and when the oxidation-reduction potential of the water to be treated is lower than a predetermined value D, the electric current flowing between the electrodes may be decreased, the predetermined value C and the predetermined value D maintaining a relationship $C \geq D$. The predetermined value C of oxidation-reduction potential of the water to be treated is preferably +100 to −100 mV, and the predetermined value D thereof is preferably +100 to −100 mV. More preferably, the predetermined value C is −40 to −60 mV and the predetermined value D is −40 to −60 mV. In this case, further, it is desired to maintain a relationship $C \geq D$.

Further, the apparatus for purifying water according to the invention includes a purifying vessel for receiving and draining water to be purified, one or more first electrodes disposed in the purifying vessel, one or more second electrodes disposed in the purifying vessel, the second electrodes maintaining a predetermined gap to the first electrodes, and a DC source for applying a DC voltage across the first electrodes and the second electrodes. The electrodes may have any shape, such as plates, round rods, square rods, etc.

The first electrodes and the second electrodes both comprise titanium. An oxide film is preformed by heat treatment on at least either the first electrodes or the second electrodes connected to the positive pole side, the oxide film having a thickness of 5 nm to 130 nm. The DC source is a regulated DC power supply which supplies a voltage of peeling and removing, by dielectric breakdown, the oxide film formed on the surfaces of electrodes which are either the first electrodes or the second electrodes that are connected to the positive pole side.

The apparatus for purifying water may be further provided with a polarity switching device for switching the polarity of voltage applied by the DC source to the first electrodes and to the second electrodes at predetermined intervals.

The apparatus for purifying water may use a constant-current power supply as the DC source. It is desired that the constant-current power supply has a capability of flowing a constant current of 0.1 to 20 A per a unit area (1 m$^2$) of the electrodes functioning as the positive electrodes, between the first electrodes and the second electrodes.

Further, the apparatus for purifying water may include a conductivity meter for measuring the electric conductivity of the water to be treated, and a current controller which, when the electric conductivity measured by the conductivity meter is higher than a predetermined value A, increases the output voltage of the DC source to increase the electric current that flows between the electrodes, and when the electric conductivity measured by the conductivity meter is lower than a predetermined value B, decreases the output voltage of the DC source to decrease the electric current that flows between the electrodes, the predetermined value A and the predetermined value B maintaining a relationship A≧B.

It is desired that the predetermined value A of electric conductivity of the water is 100 to 3000 μS/cm and the predetermined value B thereof is 100 to 3000 μS/cm, the relationship of A and B being desirably A≧B. More desirably, the predetermined value A is 700 to 800 μS/cm, and the predetermined value B is 700 to 800 μS/cm.

Further, the apparatus for purifying water may include an oxidation-reduction potential meter for measuring the oxidation-reduction potential of water to be treated, and a current controller which, when the oxidation-reduction potential measured by the oxidation-reduction potential meter is higher than a predetermined value C, increases the output voltage of the DC source to increase the electric current that flows between the electrodes, and when the oxidation-reduction potential measured by the oxidation-reduction potential meter is lower than a predetermined value D, decreases the output voltage of the DC source to decrease the electric current that flows between the electrodes, the predetermined value C and the predetermined value D maintaining a relationship C≧D.

It is desired that the predetermined value C of oxidation-reduction potential of the water to be treated is +100 to −100 mV and the predetermined value D thereof is +100 to −100 mV. More desirably, the predetermined value C is −40 to −60 mV, and the predetermined value D is −40 to −60 mV.

According to the invention, an oxide film is preformed by heat treatment having a thickness of 5 nm to 130 nm on the surfaces of electrodes comprising titanium. It is, therefore, allowed to flow an increased amount of electric current across the electrodes to increase a voltage applied across the electrodes, to increase the capability for purifying the water to be treated, and therefore, to realize the apparatus in a small size.

According to the invention, further, the oxide film on the surfaces of electrodes on the positive pole side is compulsively and dielectrically broken down, and thus electric current flows in the water through the oxide film in an amount necessary to remove the scale. Therefore, the scale in water is efficiently removed, and the electric conductivity of the water is maintained within a predetermined range.

According to the invention, further, the oxide film is preformed by heating having a thickness of 5 nm to 130 nm on the surfaces of the electrodes, the oxide film comprising rutile-type or anatase-type crystals which are robust and resistant to corrosion. Unlike the electrodes without having such an oxide film preformed thereon by heating, therefore, the oxide film is compulsively and dielectrically broken down in a decreased amount, and therefore, the electrodes which may be gradually worn out have an extended life.

Further, when the invention is provided with a polarity switching device for switching the polarity of voltage applied to the electrodes at predetermined intervals, the scale adhered and grown on the surfaces of electrodes is removed free of maintenance without requiring the removing operation by the workers, offering an advantage of decreased maintenance and management cost.

According to the invention, further, when the polarity of voltage applied to the electrode is switched at predetermined intervals, the electrodes on one side only are not worn out among the opposing electrodes, but the opposing electrodes on both sides are similarly worn out, enabling expensive titanium to be effectively utilized.

According to the invention, further, the electric current flowing between the electrodes is increased when the electric conductivity of water becomes higher than the predetermined value A, whereby the oxide film on the surfaces of electrodes on the positive pole side is compulsively and dielectrically broken down and thus electric current flows in the water despite the formation of the anodically oxidized film in an amount necessary to remove the scale. Therefore, the scale in water is efficiently removed. When the electric conductivity of water becomes lower than the predetermined value B, further, the electric current flowing between the electrodes is decreased to reduce the consumption of the electrodes.

According to the invention, further, the electric current flowing between the electrodes is increased when the oxidation-reduction potential of water becomes higher than the predetermined value C, whereby the oxide film on the surfaces of electrodes on the positive pole side is compulsively and dielectrically broken down and thus electric current flows in the water despite the formation of the oxide film in an amount necessary to remove the scale. Therefore, the scale the in water is efficiently removed. When the oxidation-reduction potential of water becomes lower than the predetermined value D, further, the electric current flowing between the electrodes is decreased to reduce the consumption of the electrodes.

BEST MODE FOR CARRYING OUT THE INVENTION

Figure 1:
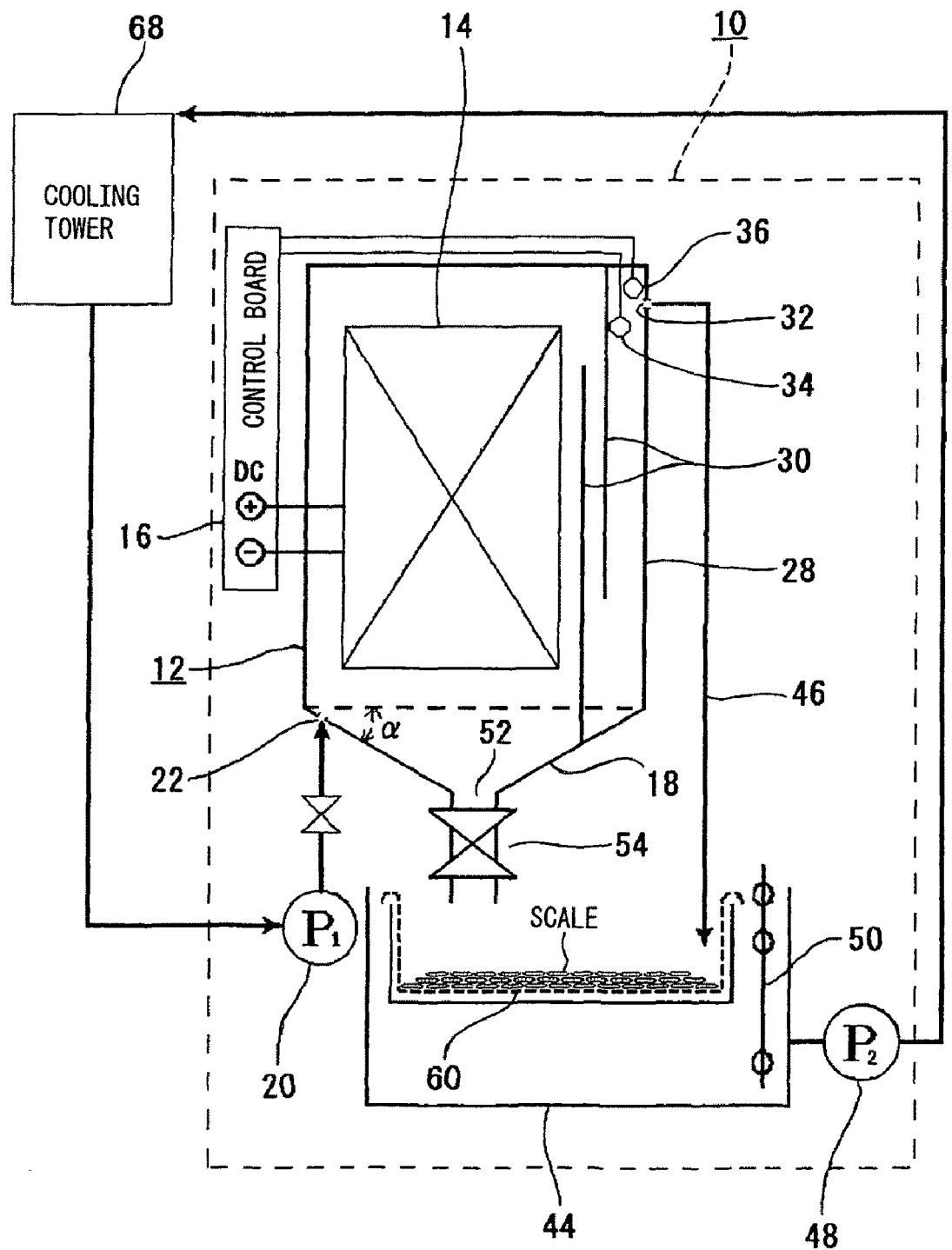
FIG. 1 is a view illustrating an apparatus for purifying water in a cooling tower according to an embodiment of the invention.
Figure 2:
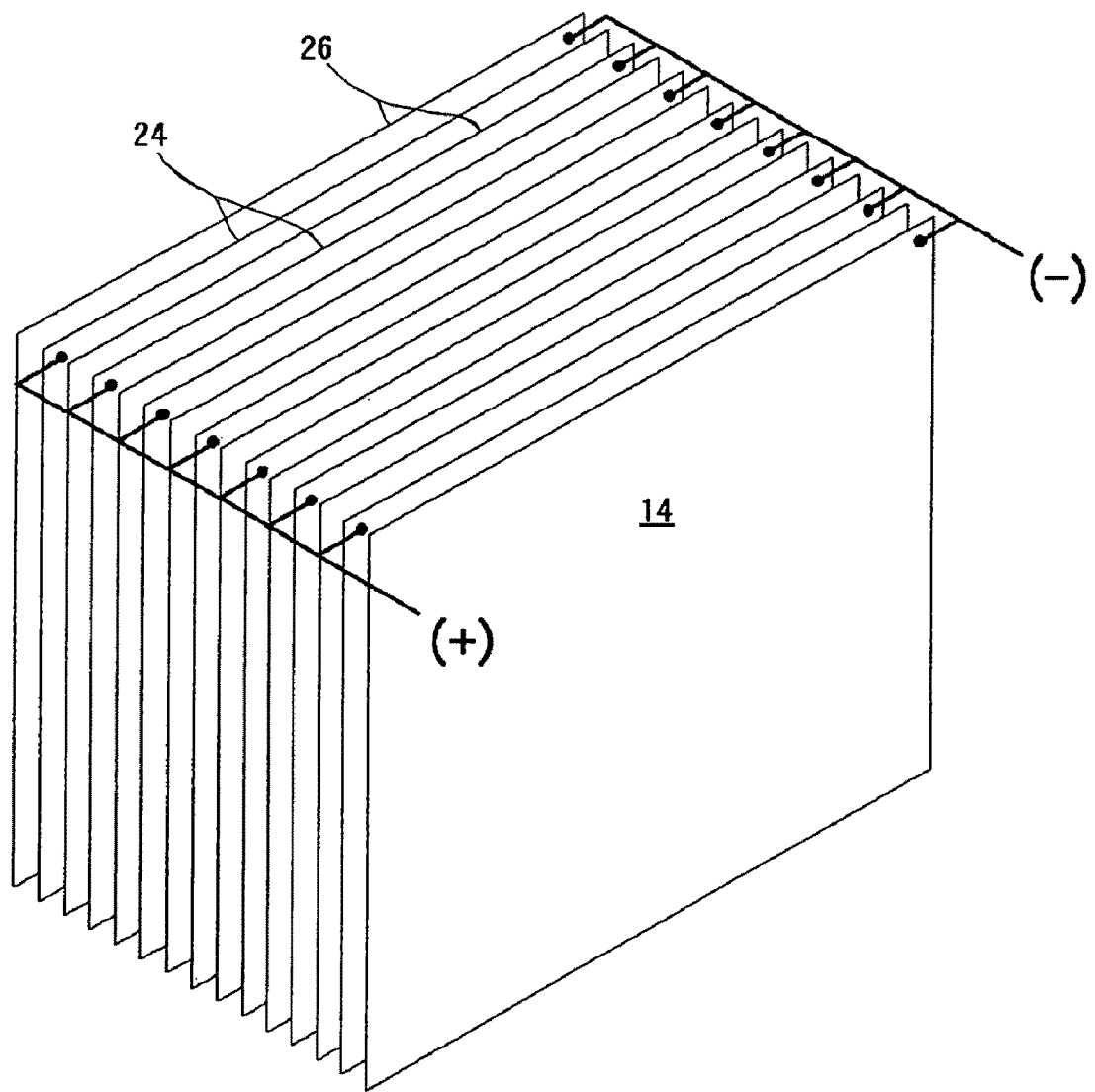
FIG. 2 is a view illustrating an electrode unit used for the purifying apparatus of FIG. 1.

FIG. 1 is a view illustrating an apparatus for purifying cooling water of a cooling tower according to an embodiment of the invention and FIG. 2 is a view illustrating an electrode unit used for the purifying apparatus of FIG. 1.

In these drawings, reference numeral 10 denotes a purifying apparatus which includes an electrolytic purifying vessel 12, an electrode unit 14 placed in the electrolytic purifying vessel 12, and a DC source 16 for feeding a direct current to the electrode unit 14.

The electrolytic purifying vessel 12 comprises a box-like container and has a water-feed port 22 provided in a bottom portion 18 of the electrolytic purifying vessel 12 at a position close to the side portion of the electrolytic purifying vessel 12 to receive the circulating cooling water (water to be treated) drained from a water-receiving vessel 74 of a cooling tower 68 via a water-feed pump 20. The sizes (capacities) of the electrolytic purifying vessel 12 and of the water-feed pump 20 are determined depending upon the size (capacity) of the cooling tower 68.

Referring to FIG. 2, the electrode unit 14 comprises a plurality of pieces of first electrodes 24 and a plurality of pieces of second electrodes 26, the first electrodes 24 and the second electrodes 26 being alternately arranged in parallel maintaining a predetermined gap. The first electrodes 24 and the second electrodes 26 comprise titanium plates, and an oxide film is preformed by heating having a thickness of 5 nm to 130 nm on the surfaces of the first electrodes 24 and the second electrodes 26. The size of the electrode unit 14 is determined depending upon the size (capacity) of the cooling tower 68.

The first electrodes 24 of the electrode unit 14 are connected to a positive output terminal of the DC source 16 while the second electrodes 26 are connected to a negative output terminal of the DC source 16. The DC source 16 is a regulated DC power supply capable of flowing electric current of about 0.1 to about 20 A per a surface area (1 m$^2$) of the first electrodes 24.

Two pieces of parallel overflow partitions 30 are provided between the side portion 28 of the electrolytic purifying vessel 12 and the electrode unit 14 at a place on the opposite side of the water-feed port 22, these partitions being slightly deviated up and down, and oriented nearly vertically maintaining a predetermined gap. A flow-out port 32 is provided in the side portion 28 of the electrolytic purifying vessel 12 at an upper position on the side where the overflow partitions 30 are provided to flow out the purified cooling water.

A conductivity meter 34 for measuring the electric conductivity of water to be treated is provided between the side portion 28 of the electrolytic purifying vessel 12 and the overflow partitions 30 near the flow-out port 32. The conductivity meter 34 is connected to an alarm device 38 and turns an alarm lamp 40 on or sounds an alarm buzzer 42 in case the electric conductivity of the water becomes greater than a predetermined value.

A float switch 36 is installed at an upper part of the electrolytic purifying vessel 12. The float switch 36 turns the alarm lamp 40 on and sounds the alarm buzzer 42 when the scale builds up on a filtering portion 60 of a receiving tank 44 causing a resistance against the flow of the treated water and blocking the drain from the electrolytic purifying vessel 12.

The receiving tank 44 is provided under the electrolytic purifying vessel 12 to temporarily store the water purified through the electrolytic purifying vessel 12. The flow-out port 32 is communicated with the receiving tank 44 via a flow-out line 46.

A return pump 48 is provided near the receiving tank 44 to return the purified water in the receiving tank 44 back to the cooling tower 68. A float switch 50 is provided in the receiving tank 44 to operate the return pump 48 when the level of water that is received becomes higher than a predetermined level and to return the water in the receiving tank 44 back to the cooling tower 68.

A drain port 52 is provided in the bottom portion 18 of the electrolytic purifying vessel 12 near the center thereof to drain the scale that is peeled off. The bottom portion 18 of the electrolytic purifying vessel 12 is inclined to become lower toward the drain port 52, the angle of inclination lying in a range of 25 degrees to 35 degrees.

A drain device 54 is provided facing downward on the back side of the bottom portion 18 of the electrolytic purifying vessel 12 at a portion where the drain port 52 is provided. The drain device 54 has a drain valve 56 which is an opening/closing device. The drain valve 56 is controlled for its timing and time for opening/closing by a timer 58 for drainage.

The flow-out side of the drain device 54 is opened without being connected to another pipe. The filtering portion 60 is provided just under the drain device 54 and over the receiving tank 44 to separate the scale drained together from the cooling water.

The drain device 54 has a draining capability, i.e., a maximum flow rate of drained water of 30 liters/minute or larger when the water is filled in the electrolytic purifying vessel 12 up to a predetermined height and the drain valve 56 is fully opened.

Figure 3:
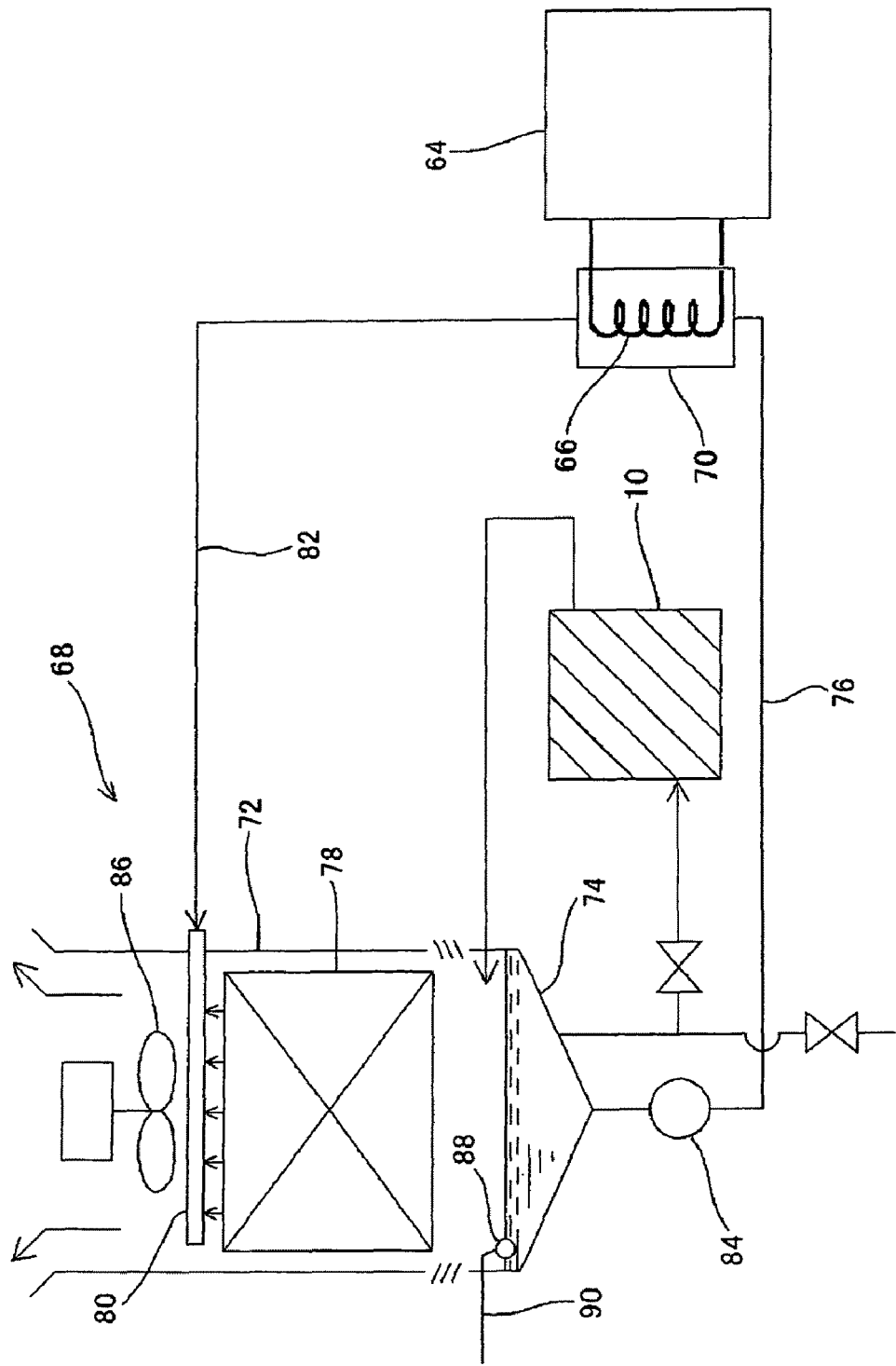
FIG. 3 is a view illustrating an air-conditioning system incorporating the purifying apparatus of FIG. 1.
Figure 4:
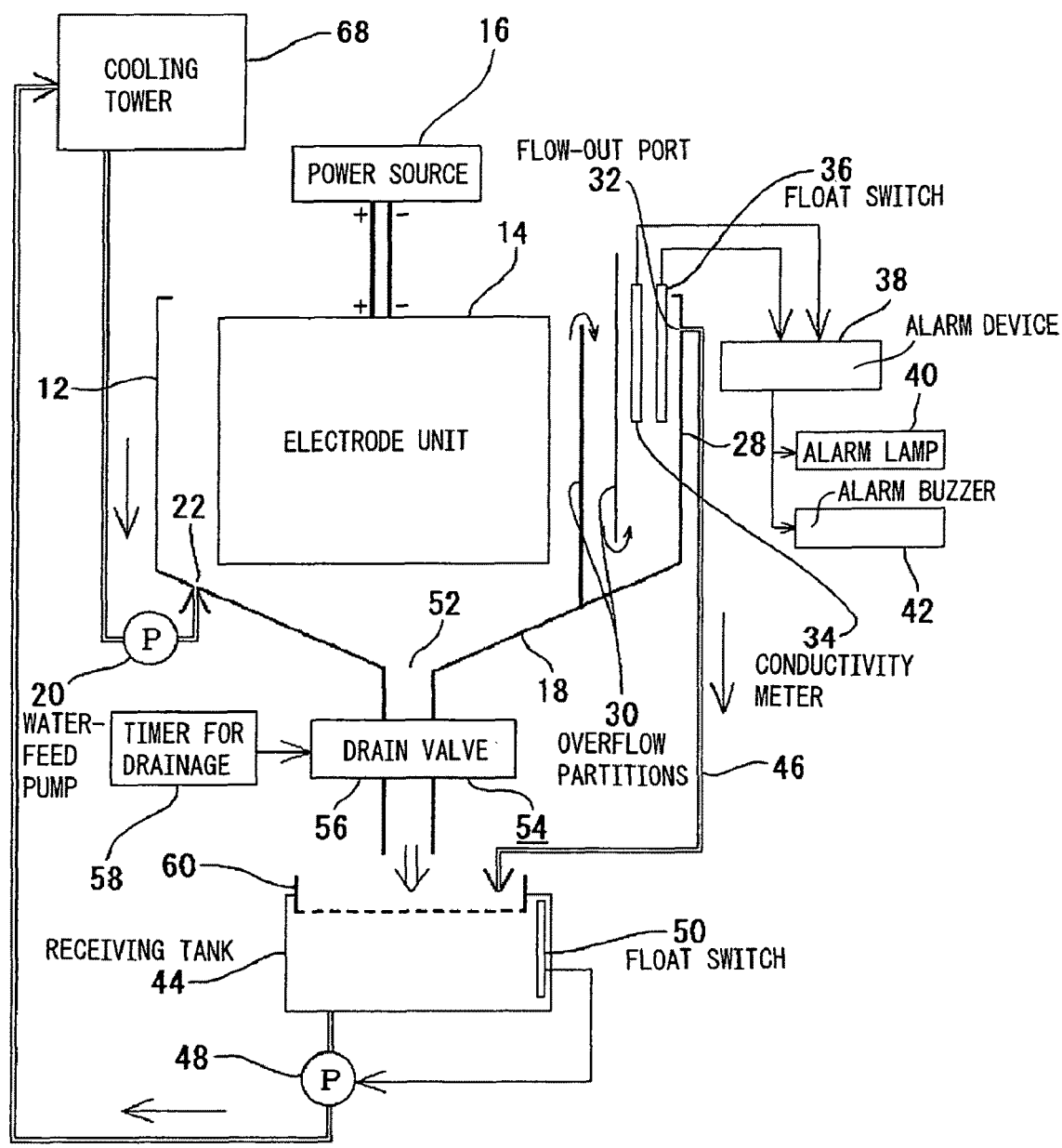
FIG. 4 is a view illustrating a control mechanism in the apparatus for purifying water of the cooling tower according to one embodiment of the invention.

Next, operation of the apparatus for purifying cooling water in the cooling tower will be described with reference to FIGS. 3 and 4. FIG. 3 is a view illustrating an air-conditioning system incorporating the purifying apparatus of FIG. 1, and FIG. 4 is a view illustrating a control mechanism in the apparatus for purifying cooling water in the cooling tower according to one embodiment of the invention.

First, when the water-feed pump 20 is operated, cooling water in a water-receiving vessel 74 of the cooling tower 68 is sucked out, and the thus sucked circulating cooling water is fed into the electrolytic purifying vessel 12 through the water-feed port 22 of the electrolytic purifying vessel 12.

The supplied cooling water submerges the electrode unit 14, flows between the overflow partitions 30, flows to the exterior of the electrolytic purifying vessel 12 through the flow-out port 32, and enters into the receiving tank 44.

The float switch 50 of the receiving tank 44 is adjusted such that the switch is turned on at a predetermined height. When the amount of cooling water in the receiving tank 44 reaches a preset height, the float switch 50 is turned on, the return pump 48 operates, and the cooling water that has entered into the receiving tank 44 is returned by the return pump 48 back to the water-receiving vessel 74 of the cooling tower 68.

When the DC source 16 is turned on in a state where the electrolytic purifying vessel 12 is filled with the cooling water, a positive voltage is applied to the first electrodes 24, a negative voltage is applied to the second electrodes 26, whereby cations such as calcium ions and magnesium ions as well as dissolved silica contained in the circulating cooling water are attracted by the second electrodes 26 and reduced on the surfaces of second electrodes 26, and precipitate as scale on the surfaces or near the surfaces of the second electrodes 26. Therefore, cations in the cooling water gradually decrease.

However, if the applied voltage is maintained constant, it becomes difficult to flow the electric current due to the insulation resistance of the oxide film on the surfaces of the first electrodes 24 to which the positive voltage is applied, making it gradually difficult to remove the scale. Therefore, the applied voltage is increased to dielectrically break down the oxide film and to peel the oxide film off the electrodes, allowing the current to easily flow.

When circulating water is continuously purified by electrolysis, cations such as calcium ions and magnesium ions as well as dissolved silica contained in the circulating cooling water precipitate as scale on the surfaces or near the surfaces of the second electrodes 26, and gradually accumulate as sludge on the bottom portion 18 of the electrolytic purifying vessel 12.

Next, the operation time and the holding time are preset to the timer 58 for drainage. After the preset operation time has passed, the timer 58 for drainage opens the drain valve 56, and circulating cooling water in the electrolytic purifying vessel 12 is drained together with the scale built up on the bottom portion 18 through the drain device 54.

The scale in the drained water is removed by filtration through the filtering portion 60, and the water enters into the receiving tank 44. The drain valve 56 is closed after the elapse of the preset holding time, and the electrolytic purifying vessel 12 is refilled with water. The scale remaining in the filtering portion 60 is successively conveyed out and removed after having built up to some extent.

The conductivity meter 34 provided near the flow-out port of the electrolytic purifying vessel 12 is measuring the electric conductivity of the circulating cooling water at all times. If the electric conductivity of water becomes greater than a preset value, the alarm device 38 is operated, the alarm lamp 40 turns on and the alarm buzzer 42 sounds.

The float switch 36 at an upper part of the electrolytic purifying vessel 12 monitors a resistance against the flow of the treated water derived from the scale building up in the filtering portion 60 of the receiving tank 44. If the resistance becomes more than or equal to a predetermined value, the float switch 36 senses the rise of the water level, the alarm lamp 40 lights and the alarm buzzer 42 sounds.

EXAMPLES

Example 1

Water in a cooling tower with a capacity of 120 refrigeration tons was drawn out from a circulation passage, fed into the apparatus of the invention to purify, and was returned back to the circulation passage after purified.

As the electrode units 14 of the apparatus of the invention, 36 pieces of titanium plates were used measuring 300 mm wide, 600 mm high and 1 mm thick and being previously heat-treated at 500° C. for 30 minutes to form a 25 nm oxide film thereon, and being opposed to each other in a number of 18 pieces on each side maintaining a pitch of 24 mm. As the DC source 16, a regulated DC power supply was used, and a constant current of 12 A was fed to the electrode unit 14 from the DC source 16.

Figure 5:
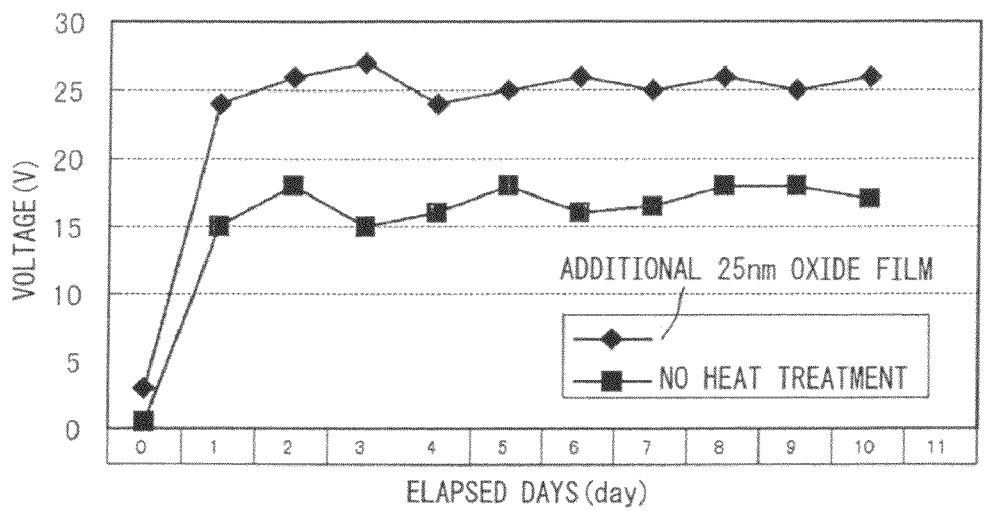
FIG. 5 is a graph illustrating a relationship between the presence of oxide film and the voltage applied across the electrodes.

Referring to FIG. 5, the voltage applied to the electrodes gradually increased from 3 V, reached 24 V, and thereafter, hovered between 24 V and 27 V. When compared to the titanium plates that had not been heat-treated, the voltage shifted 9 V higher. This is presumably due to the insulation resistance of the oxide film.

Figure 6:
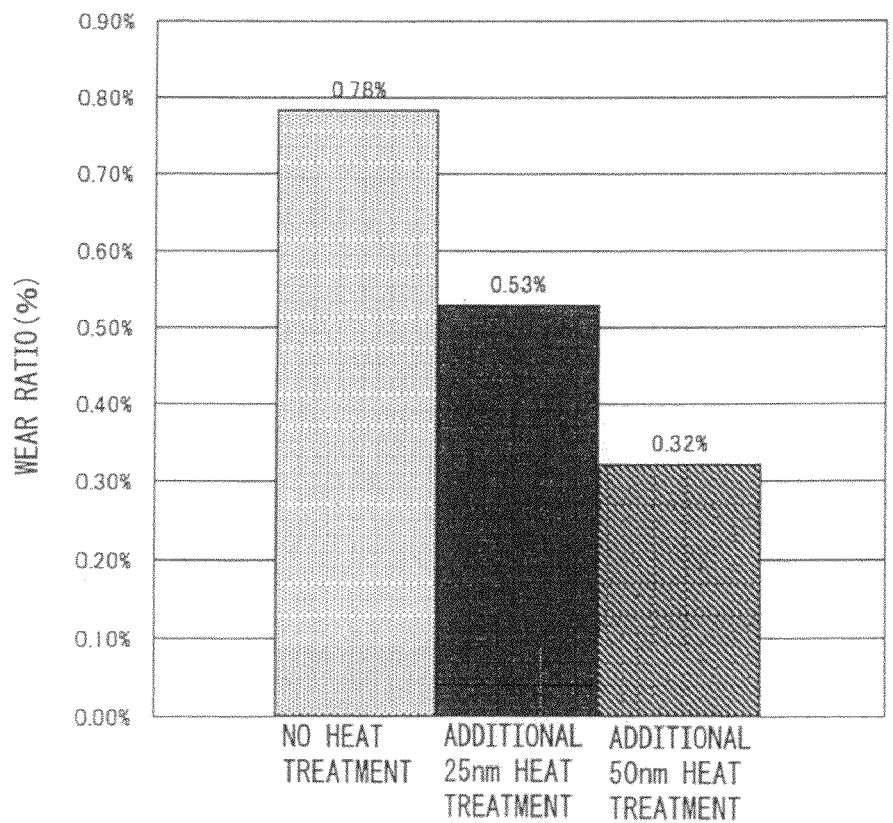
FIG. 6 is a graph illustrating a relationship between the thickness of the added oxide film and the wearout rate of the electrodes.

Further, the titanium plates were heat-treated at 600° C. for 20 minutes to form 50 nm oxide film thereon, and the same testing was conducted to compare the amounts the electrodes were worn out. When formed in thicknesses of 25 nm and 50 nm as shown in FIG. 6, the electrodes after operated for 24 hours were worn out in amounts of 0.53% and 0.32% in terms of weight percentage as compared to 0.78% of the titanium plates that had not been heat-treated, and it could be expected to lengthen the life of the electrodes.

The electric conductivity of water in this case was 1000 µS/cm, at first, but gradually decreased and stabilized at 700 to 850 µS/cm. The oxidation-reduction potential was 470 mV, at first, but gradually decreased and stabilized at −60 mV. A sludge-like substance precipitated on the bottom of the electrolytic vessel. Through the analysis, it was found that the sludge consisted chiefly of silica, calcium and magnesium.

Example 2

Figure 7:
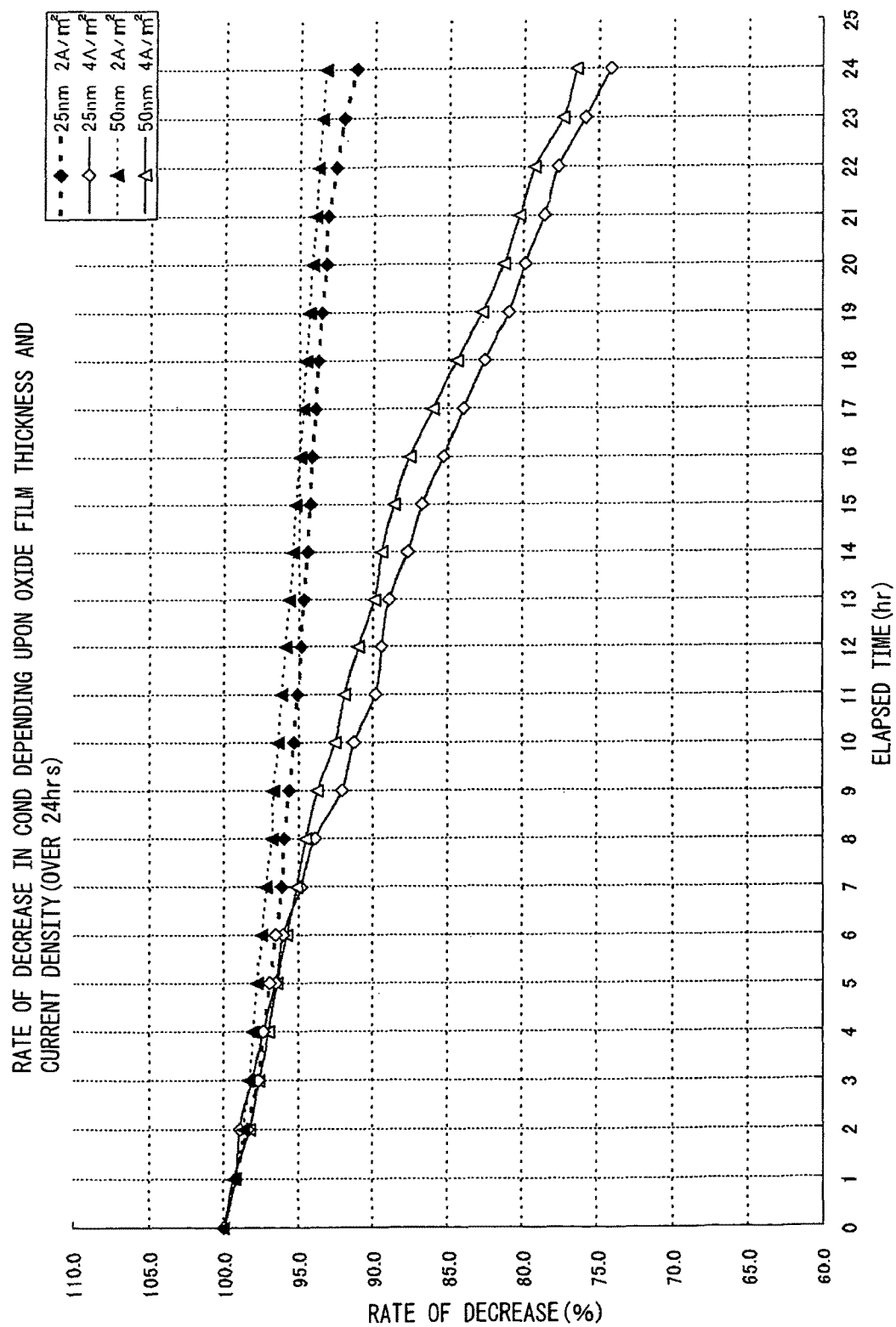
FIG. 7 is a graph showing changes of decrease in the electric conductivity (COND) depending upon the thickness of the oxide film and upon the current density.

Experiment was conducted in the same manner as in Example 1 but varying the density of electric current flowing into the electrode unit at two levels, i.e., 2 A/m$^2$ and 4 A/m$^2$. The electric conductivities (COND) of the circulating cooling water over 24 hours decreased at rates (%) as shown in FIG. 7. From this experiment, it was found that the electric conductivity (COND) of water could be further decreased by increasing the current density.

The rate of decrease (%) in the electric conductivity (COND) is a value expressed by 100−{(COND(A)/COND(B))×100, where COND(A) is an electric conductivity after a unit time (24 hr) from the start of experiment and COND(B) is an electric conductivity of raw water at the start of experiment.

Example 3

Operation was continued under the conditions of Example 1 for one week. Thereafter, the operation was conducted by reversing the polarity. Scale that had been solidly adhered on the surfaces of the positive electrodes (which had been negative electrodes before the reverse) was peeled off in about 6 hours and deposited in the bottom of the electrolytic vessel.

The operation was further continued in this state for one week. Scale solidly adhered to the surfaces of the negative electrodes, as was the case with the initial operation. Therefore, the operation was conducted by alternately changing the polarity. Scale was efficiently peeled off and deposited in the bottom of the electrolytic purifying vessel 12.

Example 4

By using a current controller, the amount of electric current fed to the electrode unit 14 from the DC source 16 was increased or decreased depending upon the electric conductivity measured by the conductivity meter 34 under the conditions of Example 1. That is, when the electric conductivity exceeded 1000 µS/cm, the electric current was increased by 100%. When the electric conductivity was smaller than 700 µS/cm, the electric current was returned back to the initial value. As a result, when the electric current was increased by 100%, the electric conductivity decreased from 1040 µS/cm to 690 µS/cm, and when the electric current was returned back to the initial value, the electric conductivity increased from 690 µS/cm to 810 µS/cm. It will be understood from the above results that a desired capability can be controlled by increasing or decreasing the constant electric current fed to the electrode unit 14.

In other words, in this experiment, the scale in water was efficiently removed. When the electric conductivity is in an allowable range, further, the electric current does not have to be excessively fed contributing to saving electric charges and preventing the electrodes from being excessively corroded and worn out.

Experiment 5

By using an oxidation-reduction potential meter for measuring the oxidation-reduction potential of water and the current controller, the amount of electric current fed to the electrode unit 14 from the DC source 16 was increased depending upon the oxidation-reduction potential measured by the oxidation-reduction potential meter like in Example 4. In other words, the electric current was increased by 100% when the oxidation-reduction potential has exceeded 200 mV. As a result, when the electric current was increased by 100%, the oxidation-reduction potential of 280 mV decreased down to −60 mV. It will be understood from the above results that a desired capability can be controlled by increasing or decreasing the constant electric current fed to the electrode unit 14.

In other words, in this experiment, the scale in water was efficiently removed. When the oxidation-reduction potential is in an allowable range, further, the electric current does not have to be excessively fed contributing to saving electric charges and preventing the electrodes from being excessively corroded.

Experiment 6

Figure 8:
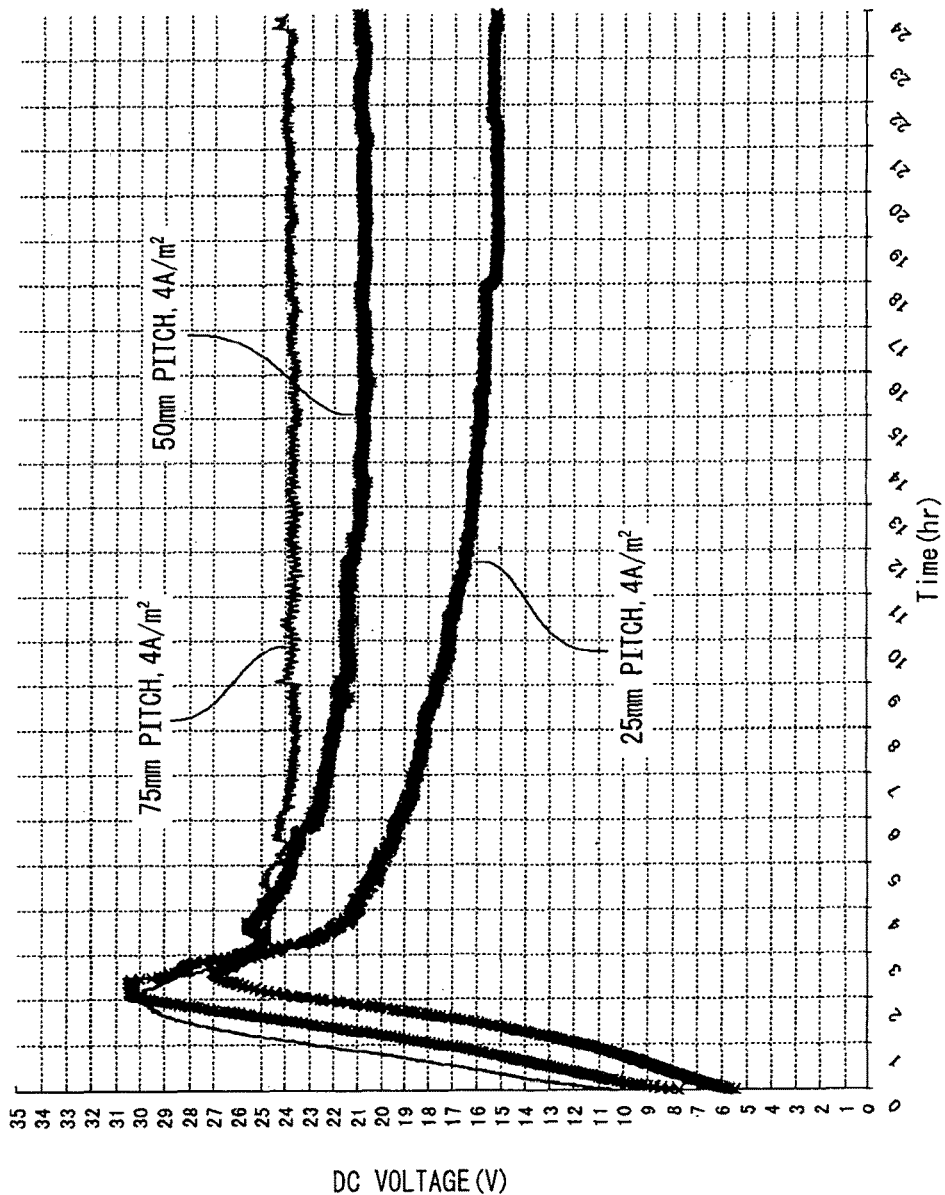
FIG. 8 is a graph showing a relationship between the gap of electrodes and the shift of voltage.
Figure 9:
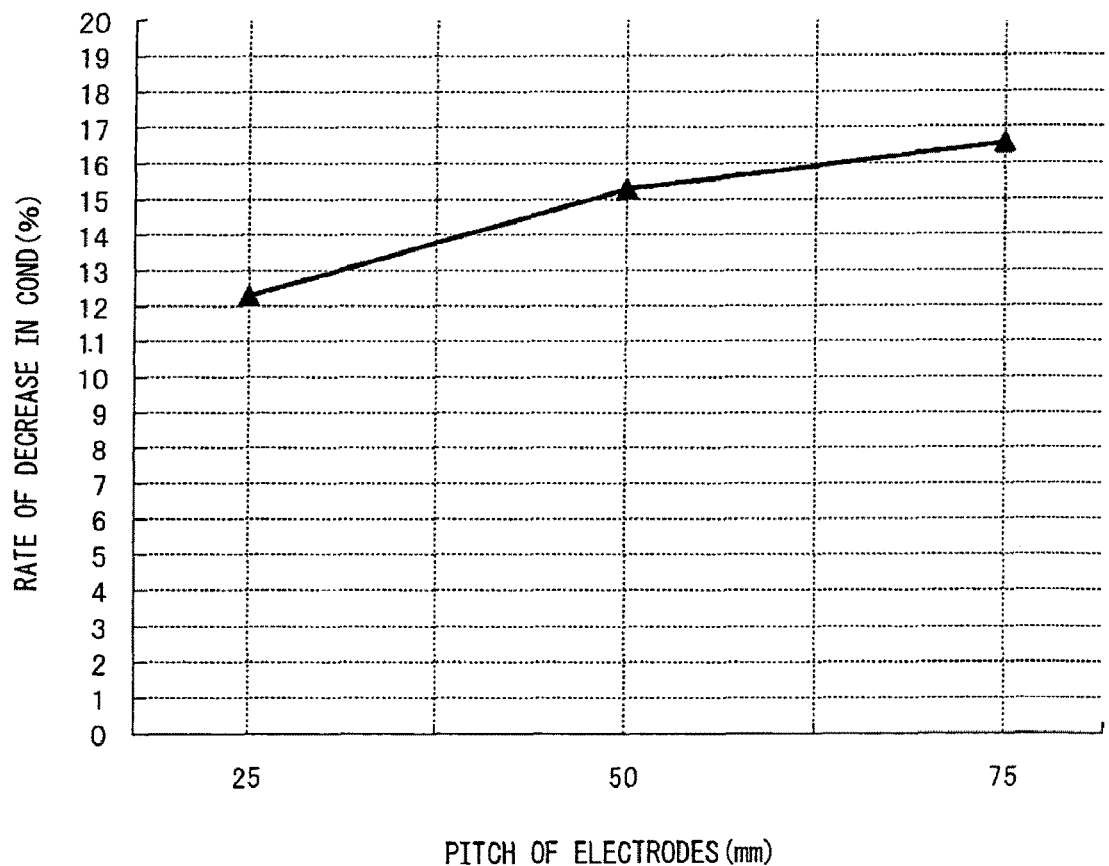
FIG. 9 is a graph showing a relationship between the gap of electrodes and the rate of decrease in the electric conductivity (COND).

Water to be treated was electrolytically purified by flowing electric current under the conditions of Example 1 but changing the gap between the electrodes to be 25 mm, 50 mm and 75 mm to examine the shift of voltage applied across the electrodes and the rate of decrease (%) in the electric conductivity (COND) of water with the elapse of time. The voltage applied across the electrodes shifted as shown in FIG. 8, and the electric conductivity (COND) of the water to be treated decreased as shown in FIG. 9.

It will be understood from the above results that when only the gap across the electrodes is varied under the conditions of Example 1, the voltage applied across the electrodes increases with an increase in the gap across the electrodes, and the electric conductivity of the water to be treated decreases at an increased rate with an increase in the voltage applied across the electrodes. In other words, to enhance the purifying capability of the apparatus, the gap across the electrodes should be broadened by increasing the size of the apparatus, and an increased voltage should be applied across the electrodes.

Figure 10:
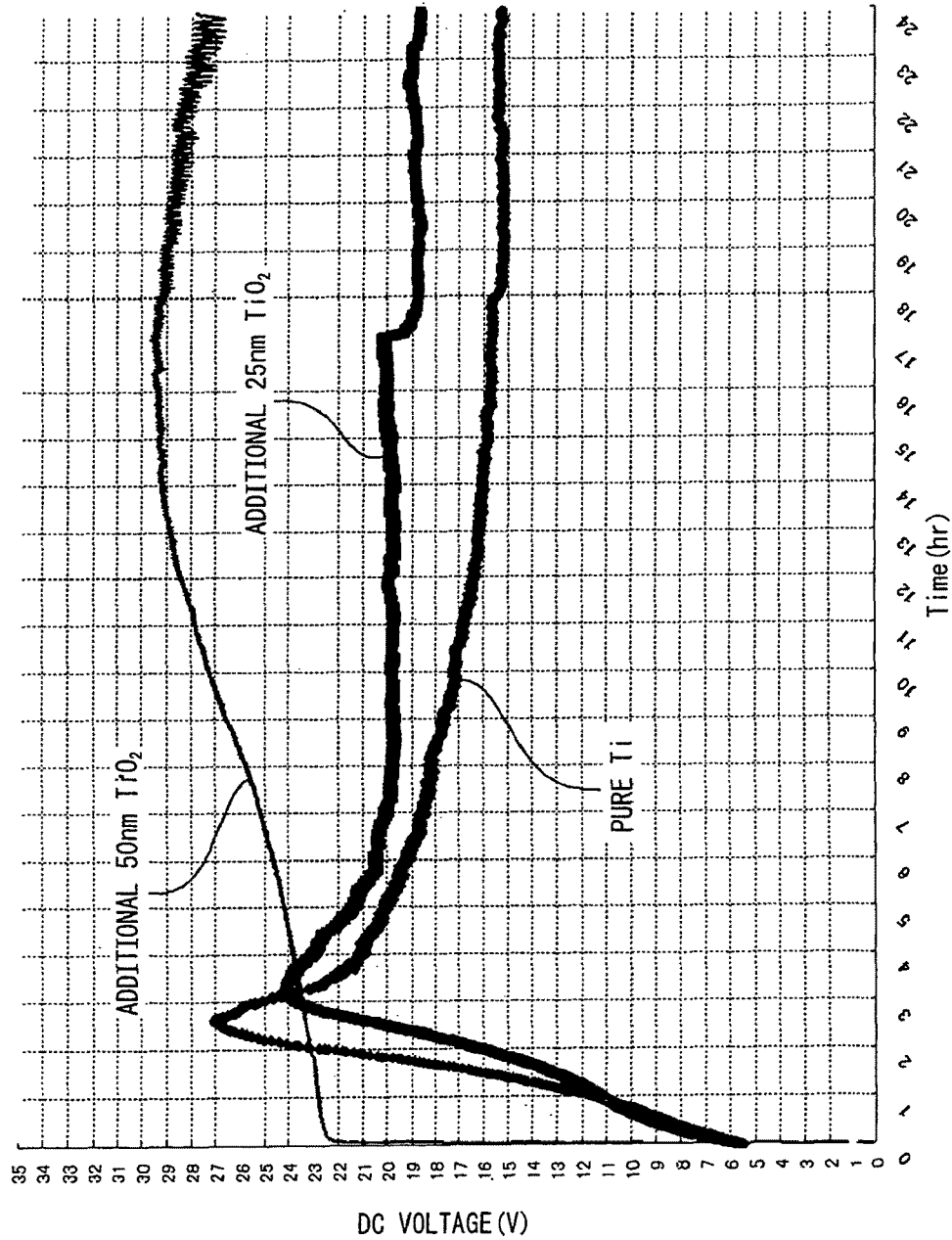
FIG. 10 is a graph showing a relationship between the thickness of the oxide film and the shift of voltage.

Next, water to be treated was purified by flowing electric current under the conditions of Example 1 but using the electrodes comprising titanium plates having an oxide film formed on the surfaces thereof by heating (thickness of the oxide film being 25 nm and 50 nm) or the electrodes comprising titanium plates having on the surfaces thereof no oxide film formed by heating, while setting the gap between the electrodes to be 25 mm, to examine the shift of voltage applied across the electrodes with the elapse of time. The voltage applied across the electrodes shifted as shown in FIG. 10.

It will be understood from the above results that when the electrodes having the oxide film preformed by heating are used, the voltage applied across the electrodes shifts higher than that of when the electrodes without oxide film preformed by heating thereon are used. It will therefore be understood that the voltage applied across the electrodes shifts higher when the oxide film is formed by heating having a larger thickness.

Figure 11:
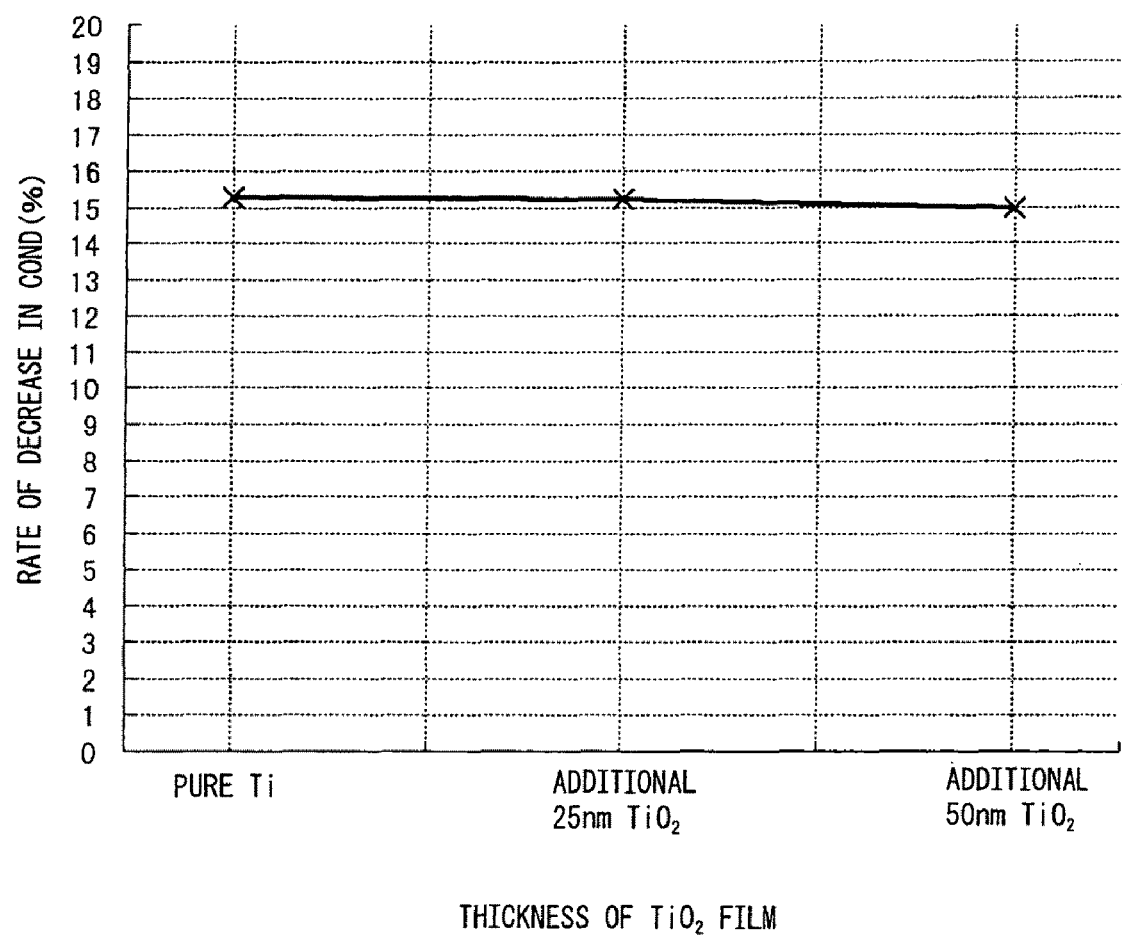
FIG. 11 is a graph showing a relationship between the thickness of the oxide film and the rate of decrease in the electric conductivity (COND).
Figure 12:
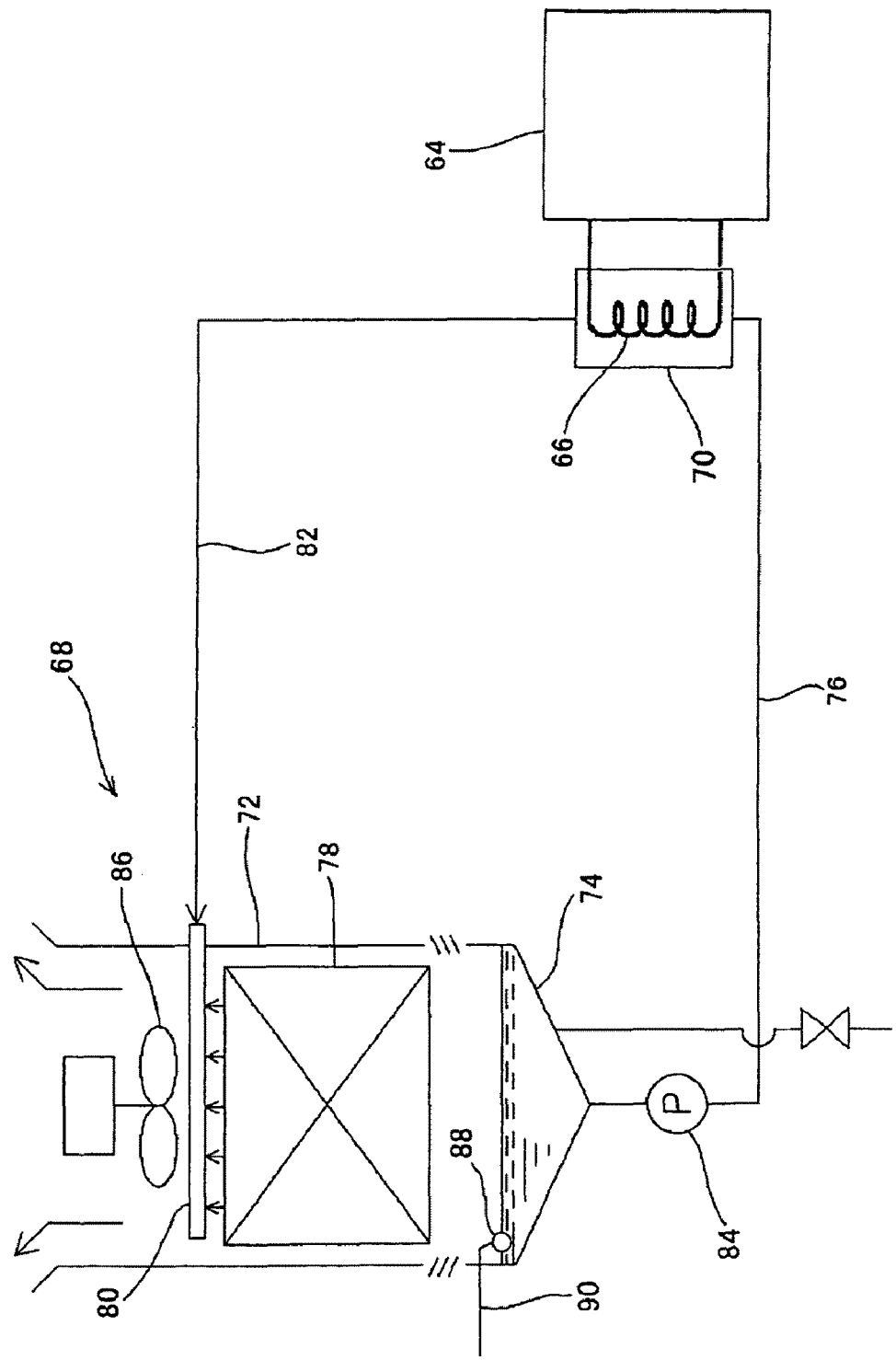
FIG. 12 is a view illustrating an air-conditioning system.

Next, water to be treated was purified under the conditions of Example 1 but using the electrodes having conditions as shown in Table 1 to examine the rate of decrease (%) in the electric conductivity (COND). The results were as shown in FIG. 11.

TABLE 1

| Electrode material | Electrode pitch (mm) | Rate of decrease in COND (%) |
|---|---|---|
| Pure Ti | 50 mm | 15.27 |
| TiO$_2$ 25 nm added | 25 mm | 15.22 |
| TiO$_2$ 50 nm added | 25 mm | 14.98 |

From the above results, it will be understood that the electric conductivity (COND) can be similarly decreased when the electrodes having no oxide film formed thereon by heating are used while setting the gap between the electrodes to be 50 mm, and when the electrodes having the oxide film preformed thereon by heating are used while setting the gap between the electrodes to be 25 mm. In other words, even without doubling the size of the apparatus, the treating capability can be doubled using the apparatus of the same size as that of the prior art if the oxide film is preformed on the surfaces of electrodes by heating.

INDUSTRIAL APPLICABILITY

The present invention can be used not only for purifying water of a cooling tower, but also for purifying circulating water for chilling, circulating water for a water cooler/heater, water replenished to a boiler, water replenished to a heat pump-type hot water feeder, water replenished to an electric hot water feeder, water replenished to a gas/petroleum hot water feeder, water for cooling a mold used in injection-molding machine or the like, water used for a humidifier, water used for an electric heating system such as induction heating furnace or the like, water (raw water) fed to an apparatus for producing pure water, water of a 24-hour-heated bath, water of a pool, water of an artificial pond, etc.

The invention claimed is:
1. A method of purifying water comprising:
applying a DC voltage across first electrodes and second electrodes opposing the first electrodes by a DC source having a positive pole and a negative pole, while flowing water to be treated therebetween to flow electric current between the first electrodes and the second electrodes to precipitate cations in the water to be treated on surfaces of the first electrodes or the second electrodes connected to the negative pole of the DC source to purify the water to be treated, wherein the first electrodes and the second electrodes comprise titanium and have an oxide film preformed by heating and having a thickness of 5 nm to 130 nm on the surfaces of the first electrodes and the second electrodes; and
applying the DC voltage sufficiently so that the electric current is flown between the first electrodes and the second electrodes to dielectrically break down the oxide film on the surfaces of the first electrodes and the second electrodes on the positive pole of the DC source.

2. The method of purifying water according to claim 1, wherein a polarity of voltage applied across the first electrodes and the second electrodes is switched at predetermined intervals.

3. The method of purifying water according to claim 1, wherein the current flowing between the first electrodes and the second electrodes is a constant current.

4. The method of purifying water according to claim 3, wherein the electric current flowing between the first electrodes and the second electrodes is in a range of 0.1 to 20 A per a unit area (1 m$^2$) of the first electrodes or the second electrodes connected to the positive pole.

5. The method of purifying water according to claim 1, wherein when the electric conductivity of the water to be treated is higher than a predetermined value A, the electric current flowing between the first electrodes and the second electrodes is increased, and when the electric conductivity of the water to be treated is lower than a predetermined value B, the electric current flowing between the first electrodes and the second electrodes is decreased, and wherein the predetermined value A and the predetermined value B maintaining a relationship of: $A \geq B$.

6. The method of purifying water according to claim 5, wherein the predetermined value A of electric conductivity of the water to be treated is 100 to 3000 μS/cm and the predetermined value B is in a range of 100 to 3000 μS.

7. The method of purifying water according to claim 1, wherein when the oxidation-reduction potential of the water to be treated is higher than a predetermined value C, the electric current flowing between the first electrodes and the second electrodes is increased, and when the oxidation-reduction potential of the water to be treated is lower than a predetermined value D, the electric current flowing between the first electrodes and the second electrodes is decreased, and wherein the predetermined value C and the predetermined value D maintaining a relationship of: $C \geq D$.

8. The method of purifying water according to claim 7, wherein the predetermined value C of oxidation-reduction potential of the water to be treated is in a range of +100 to −100 mV and the predetermined value D is in a range of +100 to −100 mV.

9. An apparatus for purifying circulating water comprising:
a purifying vessel for receiving and draining water to be purified,
one or more first electrodes disposed in the purifying vessel,
one or more second electrodes disposed in the purifying vessel maintaining a predetermined gap from the first electrodes, and
a DC source having a positive pole and a negative pole for applying a DC voltage across the first electrodes and the second electrodes, wherein the first electrodes and the second electrodes both comprise titanium and an oxide film having a thickness of 5 nm to 130 nm is preformed by heating on at least the first electrodes or the second electrodes connected to the positive pole of the DC source, wherein the DC source is a regulated DC power supply configured to supply a voltage sufficient for peeling and removing, by dielectric breakdown, the oxide film formed on the surfaces of the first electrodes or the second electrodes that are connected to the positive pole of the DC source.

10. The apparatus for purifying water according to claim 9, further comprising a polarity switching device for switching the polarity of voltage applied by the DC source to the first electrodes and to the second electrodes at predetermined intervals.

11. The apparatus for purifying water according to claim 9, wherein the DC source is a constant-current power supply configured to flow a constant current in a range of 0.1 to 20 A per a unit area (1 m$^2$) of electrodes on the positive pole side, between the first electrodes and the second electrodes.

12. The apparatus for purifying water according to claim 9, further comprising a conductivity meter for measuring the electric conductivity of the water to be treated, and a current controller which, when the electric conductivity measured by the conductivity meter is higher than a predetermined value A, increases the output voltage of the DC source to increase the electric current that flows between the first electrodes and the second electrodes, and when the electric conductivity measured by the conductivity meter is lower than a predetermined value B, decreases the output voltage of the DC source to decrease the electric current that flows between the first electrodes and the second electrodes, the predetermined value A and the predetermined value B maintaining a relationship of: $A \geq B$.

13. The apparatus for purifying water according to claim 12, wherein the predetermined value A of electric conductivity of the water to be treated is in a range of 100 to 3000 μS/cm and the predetermined value B is in a range of 100 to 3000 μS/cm.

14. The apparatus for purifying water according to claim 9, further comprising an oxidation-reduction potential meter for measuring the oxidation-reduction potential of the water to be treated, and a current controller which, when the oxidation-reduction potential measured by the oxidation-reduction potential meter is higher than a predetermined value C, increases the output voltage of the DC source to increase the electric current that flows between the first electrodes and the second electrodes, and when the oxidation-reduction potential measured by the oxidation-reduction potential meter is lower than a predetermined value D, decreases the output voltage of the DC source to decrease the electric current that flows between the first electrodes and the second electrodes, the predetermined value C and the predetermined value D maintaining a relationship of: $C \geq D$.

15. The apparatus for purifying water according to claim 14, wherein the predetermined value C of oxidation-reduction potential of the water to be treated is in a range of +100 to −100 mV and the predetermined value D is in a range of +100 to −100 mV.

* * * * *